Figure 1:
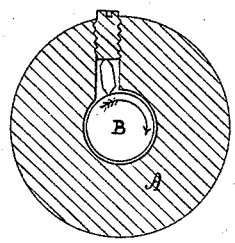
Figure 1:
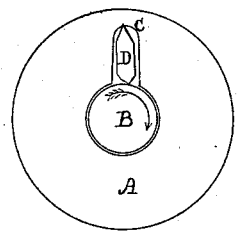

R. BLAKE & S. A. DAVIS.
Machine Brakes.

No. 149,567.

Patented April 14, 1874.

Fig. II.

WITNESSES:

INVENTOR
Robert Blake
Stephen A. Davis

UNITED STATES PATENT OFFICE.

ROBERT BLAKE AND STEPHEN A. DAVIS, OF NEWARK, NEW JERSEY, ASSIGNORS TO ROBERT BLAKE, OF SAME PLACE.

IMPROVEMENT IN MACHINE-BRAKES.

Specification forming part of Letters Patent No. 149,567, dated April 14, 1874; application filed October 6, 1873.

*To all whom it may concern:*

Be it known that we, ROBERT BLAKE and STEPHEN A. DAVIS, both of the city of Newark, in the county of Essex and State of New Jersey, have invented new and useful Improvements in Clutch Devices for Sewing and other Machines; and we do hereby declare that the following specification, taken in connection with the drawing furnished, is a full, clear, and exact description thereof, which will enable others skilled in the art to make and use the same.

Our invention relates to wheels that may run loosely upon a shaft in one direction, and engage the latter when moved the reverse; and it consists in the construction and employment of a knuckle arranged to vibrate within a rectangular opening in the hub of the wheel adjacent to, and opening upon, the shaft or bearing upon which it rotates.

The object of our invention is to simplify and lessen the cost of construction, as compared with the self-engaging wheels now most known in use, and at the same time insure a positive engagement of wheel and shaft, notwithstanding the ordinary accumulation of oil, &c., at the points of union.

It is obvious that, in practice, end engagements take a more firm hold than round objects, and at the same time are not so apt to wedge, and will readily disengage when turned in an adverse direction.

Referring to the drawing, Figure 1 represents a suitable formation of parts embodying the principles of our invention.

A represents the hub of a wheel; B, shaft; C, socket or chamber; D, loose movable knuckle.

We form the opening by molding or otherwise. Sometimes we form the opening through one side of the hub or wheel, plugging the mouth of the opening by screw or otherwise to retain the knuckle therein, the screw serving as an efficient means for compensating for any wear whereby the knuckle becomes too short to engage in the manner desired. The opening in any case should be somewhat larger than the knuckle which is to operate therein, so that sufficient latitude may be given for its free action. The opening may be rectangular with its bearing, or slightly oblique, and the key or knuckle of sufficient length to rest endwise against the top of the opening in the wheel and engage the shaft at its opposite end without passing over the center of its diameter. Steel for the knuckle is preferable, although other metals may be employed.

The drawing exhibits suitable proportions and arrangement of parts, which may be varied according to sizes of wheels and work to be performed.

We do not claim, broadly, the adoption of movable keys or knuckles, as we are aware that they have been hitherto applied in various ways, engaging the wheel and shaft in an indirect manner by the employment of intermediate devices, such as rings, springs, socketed bearings, hinging of keys, &c., which are expensive, and the manner of their application is such as to require large hubs, consequently not so easily applied to small wheels. We are also aware that balls or rolling bodies have been employed to engage shaft and wheel. These are apt to become inoperative in consequence of the accumulation of oil and other matters within the space they occupy. Our invention differs from the foregoing, which we do not claim, as we apply our locking device loosely within a rectangular or similar slot opening in the hub without other parts, thereby locking the wheel and shaft direct by the end action of the knuckle, which makes it particularly desirable and applicable to small wheels, &c.

Having thus set forth our invention, what we claim and desire to secure by Letters Patent of the United States, is—

1. The combination, with a wheel provided with a rectangular or similar slot opening in its hub, of the knuckle D, having an endwise vibratory movement within the slot for the purpose of locking the shaft in one direction, substantially as shown and described.

2. The combination, with an automatic locking device arranged within a wheel, of an adjusting-screw for the purpose of compensating for wear, substantially as shown and described.

ROBT. BLAKE.
STEPHEN A. DAVIS.

Witnesses:
JOHN DANE, Jr.
ISAAC J. McCABE.